S. S. Gray,
Wood Planing Machine.
No. 945. Reissued Apr. 17, 1860.
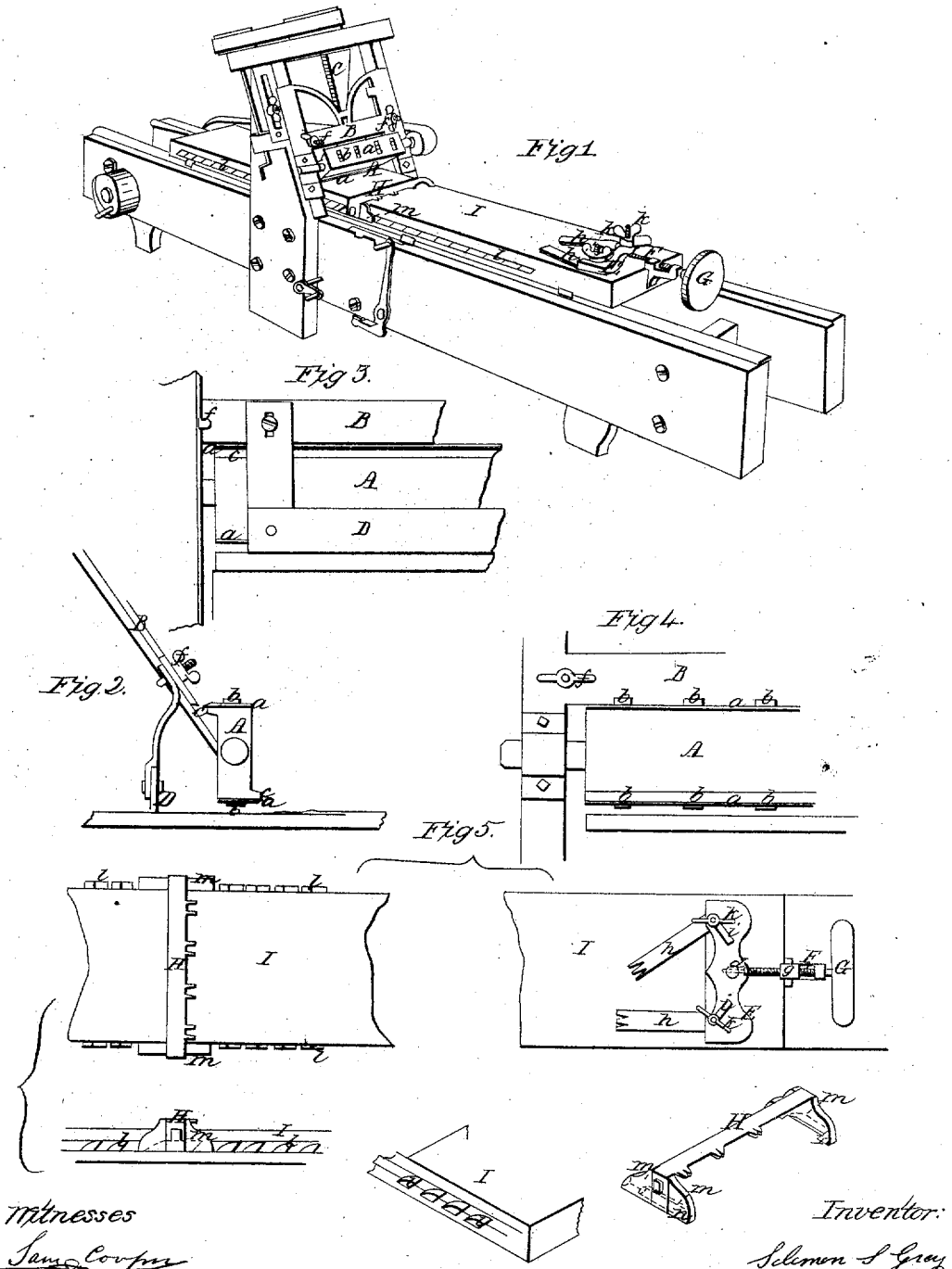
Witnesses
Sam. Cooper
John S. Blow
Inventor:
Solomon S. Gray
AM. PHOTO-LITHO. CO. N.Y. (OSBORNE'S PROCESS.)

UNITED STATES PATENT OFFICE.

SOLOMON S. GRAY AND S. A. WOODS, OF BOSTON, MASSACHUSETTS, ASSIGNEES OF SOLOMON S. GRAY.

IMPROVED MACHINE FOR PLANING LUMBER OUT OF WIND.

Specification forming part of Letters Patent No. 11,582, dated August 22, 1854; Reissue No. 945, dated April 17, 1860.

*To all whom it may concern:*

Be it known that we, SOLOMON S. GRAY and S. A. WOODS, both of Boston, in the county of Suffolk and State of Massachusetts, assignees of SOLOMON S. GRAY aforesaid, do hereby declare that the said SOLOMON S. GRAY did invent certain new and useful Improvements in Planing-Machines; and for the purpose of obtaining a reissue we do hereby declare that the following is a full, clear, and exact description of the same, reference being had to the annexed drawings, making a part of this specification, in which—

Figure 1 is a perspective view of a planing-machine with the improvements attached. Fig. 2 is a section through the cutter-cylinder and the parts immediately connected therewith. Fig. 3 is a view of the bar which prevents the board from being raised by the action of the cylinder-cutters. Fig. 4 is a front view of the cutter-head and cutter; Fig. 5, a plan of the traveling bed with the clamps for securing the lumber.

Planing-machines may be divided into two classes—those in which pressure is applied to the plank before and behind the cutter, and which reduce boards to a uniform thickness, and those which are calculated to plane out of wind, and in which, consequently, no pressure can be applied to the board. In machines of the latter class, of which the "Daniels planer" is an instance, it has not been found practicable to make use of cylinder-cutters, as these require that the board be held firmly upon its bed, or, at least, that it be prevented from rising therefrom. The necessity has therefore existed in machines for planing out of wind of using cutters which revolve horizontally across the board, the operation of which is very slow.

The first part of our invention consists in a peculiar construction of cutter-head for the purpose of more effectually turning and breaking the shavings, the duty of the cap being performed by a portion of the cutter-head, which is peculiarly formed for the purpose, as will be hereinafter more fully explained, and also in using with said cutter-head and a traveling bed a bar to prevent the board from casually rising from its proper place.

Our second improvement consists in a peculiar form of clamp, which is especially applicable to planing-machines of this class, by which boards with inclined ends may be instantaneously and securely dogged, or pieces of different lengths may be planed at the same time.

To enable those skilled in the art to make and use the invention aforesaid, we will proceed to describe it.

The general features of the machine, as they do not differ from those of others of this class, need not be here described.

A is the cutter-head, of the form represented in Fig. 2, the plane-irons *a* being secured to it by the screws *b*, working in slots in the planing-irons immediately back of the cutting-edge of the planing-iron. The cutter-head is made concave, as seen at *c*, Fig. 2, for the purpose of bending over and breaking the shaving. The cutter-head itself is thus made to form the cap of the iron, its concave form immediately behind the cutting-edge adapting it peculiarly to this purpose. The cutter-head is raised and lowered in the usual manner in its frame B by means of the screw C, and is clamped firmly to its ways by the thumb-nuts *f*. E is the clamp. (Seen in plan in Fig. 5.) The body of the clamp is pivoted at its center *d* upon the end of the screw F, which works in the nut *g*, and is operated by the hand-wheel G. The dogs *h* are pivoted to the body of the clamp, and may be secured by means of the thumb-nuts *k* in any position required for the purpose of holding pieces of different lengths, or of dogging boards with oblique ends. One end of the board being secured to the movable dog H, the dogs *h* are made to bear upon the other end of it. The thumb-nuts *k* are then tightened, and the clamp, which is forced up by turning the screw G, adjusts itself by swiveling upon the point *d* until both its dogs have an equal bearing upon the end of the board. Both the dog H and the clamp E are secured to the movable bed I, which carries the lumber through the machine.

For the purpose of holding the dog H securely to the bed of the machine, and also to enable it to be readily and quickly moved, to accommodate it to the different lengths of boards to be planed, we make use of the following device: *l* are teeth or cogs, which are suitably secured to both sides of the bed of the machine, as seen in the drawings, the advance side being inclined and the top curved, as represented in the different views given in Fig. 5. The dog H is furnished with side pieces, *m m*, which are so mortised upon their inner side as to fit over the cogs *l*, the inclined edge *n* of the mortise bearing against the under side of the cogs. The dog is thus held immovably and firmly to its place, while it may be instantaneously and easily moved at any moment that it becomes necessary.

To the frame B of the cutter-head A a bar, D, is attached by pendants. These pendants are secured to the frame by set-screws, so that the bar D may be raised and lowered. The bar D has a transverse position over the bed I, and when the machine is in operation rests lightly on the board or stuff just behind the cutter-head A, as shown clearly in Fig. 2. This bar D prevents the board from rising under the action of the cutters, and is an essential feature in a machine for planing stuff out of wind, for the stuff cannot be pressed down and kept firm on the bed, as in ordinary planing-machines, as the stuff would then be sprung out of its warped form, and when planed would again resume said form.

It is necessary, therefore, that the stuff be firmly secured on the bed in its warped or winding state, which is done by the manner of dogging hereinbefore described, and as the cutter-head A, owing to its construction, will have a great tendency to raise the stuff by its action upon it, such contingency is fully obviated by the bar D, which bears very lightly on the stuff just back of the cutter-head and effectually compensates for any upward action of the cutter-head on the stuff.

We do not claim a pressure-bar arranged to bear on the board or stuff and keep the same firmly down on the bed, for such device is used on ordinary planing-machines; but We do claim as new and desire to secure by Letters Patent—

1. The peculiar construction of cutter-head herein described, the cutter-head itself being made use of to turn and break the shaving in the manner of a double iron plane, and being furthermore made concave for the purpose of facilitating this operation.

2. The clamp as herein described, for the purpose of dogging the lumber to the bed of the machine, the body of the clamp being pivoted at *d*, and forced up by the screw F, or its equivalent, the dog *h* being adjustable therein, in the manner and for the purpose set forth.

3. The within-described method of securing the dog H to the bed of the machine by means of the teeth or cogs *l* and the mortises in the side pieces, *m*, for the purpose set forth.

4. The bar D or its equivalent, in combination with a rotary cutter-head and traveling bed, I, provided with suitable dogs, for planing straight and out of wind, substantially as set forth.

SOLOMON S. GRAY.
S. A. WOODS.

Witnesses:
JAMES A. WOODBURY,
J. H. HATCH.